United States Patent Office 3,623,841
Patented Nov. 30, 1971

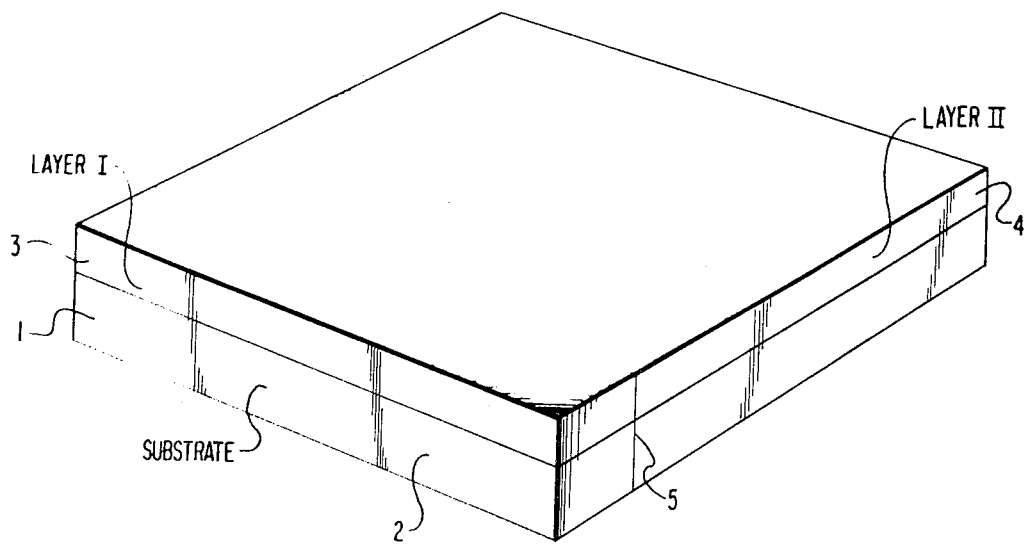

3,623,841
SEPARATION BY THIN-LAYER CHROMATOGRAPHY WITH A TWO-LAYER PLATE
Friedrich Kraffczyk, Herbert Halpaap, and Roland Helger, Darmstadt, Germany, assignors to Merck Patent Gesellschaft mit beschrankter Haftung, Darmstadt, Germany
Filed July 15, 1969, Ser. No. 841,712
Claims priority, application Germany, July 19, 1968, P 17 92 083.1
Int. Cl. B01d 15/08; G01n 31/04, 33/16
U.S. Cl. 23—230 B
26 Claims

ABSTRACT OF THE DISCLOSURE

Thin-layer chromatographic plates are provided with two layers, one for the removal of interfering constituents and the other for the separation of amino acids.

BACKGROUND OF THE INVENTION

In thin-layer chromatography of amino acids, particularly those of biological fluids, such as urine or of aminoacid-containing hydrolyzates, accompanying substances, e.g. salts, acids, and/or neutral components, e.g. sugar or other carbohydrates, present therein in large quantities, exert an interfering effect. Consequently, such interfering substances previously had to be removed, e.g. by column chromatography on ion exchangers prior to conducting thin-layer chromatography with the resulting amino-acid-containing eluting agents.

The production of two-layer and multiple-layer plates and the principle of applying them to various separation problems is recognized. Thus, a two-layer plate of activated charcoal and silica gel has been proposed for the determination of pesticides in vegetable materials. So-called gradient layers, wherein the composition of the adsorbent changes continuously, have been produced. In such layers, the content of an adsorbent A therein increases continuously from the start, whereas the content of another adsorbent B decreases continuously. By means of these gradient layers, it is possible, for example, to determine rapidly and simply which mixture ratio of various adsorbents results in the best separation.

Furthermore, tagged iodoamino acids or iodofluoresceins have been thin-layer chromatographed after separating non-reacted iodine carrying a layer of an ion exchanger. Thin-layer chromatography plates with a strip impregnated by silver nitrate have also been employed for two-dimensional chromatography of fats and fatty acids. In the first dimension, the mixture is separated on the impregnated strip in accordance with the number and position of double bonds; in the second dimension, the transition occurs from the impregnated into the non-impregnated layer where further separation on the mixture of substances is effected.

The use of layers consisting of a mixture of ion exchangers based on polystyrene (75–85%) and cellulose (15–25%) is unsuitable for separating amino acids from neutral substances and/or electrolytes and thereafter chromatographing the amino acids.

Layered strips of a basic, acidic or neutral material make it possible to carry out a differentiation in accordance with the pH value. However, no prior art suggestion is found for a two-layer plate which both affords the separation of amino acids and eliminates the need for a preliminary separation of neutral substances and/or electrolytes.

BRIEF DESCRIPTION OF THE DRAWING

The figure shows an isometric view of a two-layer plate according to the invention.

SUMMARY OF THE INVENTION

A two-layer plate for thin-layer chromatography consisting of a reaction zone (layer I) and an adsorbent layer (layer II), following the reaction zone, on a conventional substrate makes it possible to omit the previously required and time-consuming desalting and/or working up of amino-acid-containing solutions. The two-layer plate is used for the separation of amino acid solutions by thin-layer chromatography without any preliminary separation of customarily troublesome accompanying substances.

The use of said two-layer plate affords considerable advantages. Thus, 6–18 amino acids may be desalted and/or worked up in the simplest manner on a plate having dimensions of 10 x 20 or 20 x 20 cm., with a 2 cm. reaction zone strip. In contrast thereto, in prior processes a corresponding number of columns to be filled or regenerated was required. Thereafter, in each individual column, the acids and neutral substances had to be eluted individually. The next step was the elution of the amino acids; then the individual eluates had to be concentrated. The amount of work involved in this working-up process was so great that it was almost impossible to conduct a series examination in accordance therewith. There is a great need for rapid and effective separating processes since disturbances of amino acid metabolism cause irreversible cerebral disorders after a short period of time; such disorders in new-born infants can result in imbecility or death, if therapy is not begun in time. Clinical symptoms often do not occur until irreversible damage is already present. Some of such disorders are accompanied by an increase in the concentration of one or several specific amino acids in the urine; the increase can be detected by thin-layer chromatography. However, especially the urine amino acids could heretofore only be separated by means of thin-layer chromatography after having been sufficiently desalted. The two-layer plate and the process of this invention provide profound advantages in the field of series tests. The simplicity of the process makes it particularly well suited to screening tests.

Another special advantage of said two-layer plate is the small amount of substance required. Only that amount of crude test solution which is actually required for the subsequent thin-layer chromatography need be employed. In this way, the specific advantage of thin-layer chromatography, namely the small need for substance, is fully exploited. In contrast thereto, it is virtually impossible to transfer quantitatively to a thin-layer plate a solution of amino acids previously introduced into a column for desalting purposes.

Moreover, the two-layer plate and the process for using same are advantageously employed in all cases wherein amino acids are obtained in a mixture with other accompanying substances, particularly electrolytes. In this connection, hydrolyzates, e.g., are of importance. They are obtained, for instance, in the examination of proteins, peptides or other amino-acid-containing compounds. Hydrolyzate solutions normally contain large amounts of the hydrolyzing agent, e.g. hydrochloric acid or sodium hydroxide or, after the usually following neutralization, corresponding amounts of sodium chloride. Heretofore, it has always been necessary to separate these electrolytes first in order to obtain a usable amino acid chromatogram.

It is thus an object of this invention to provide a means for chromatographing amino acids contaminated with interfering components. Another object is to provide a thin-layer plate to effect the required separation of interfering components and chromatography. A further object is to determine suitable compositions for each of the two layers of the thin-layer plate. It is also an object to evolve a procedure whereby contaminated amino acid mixtures can be chromatographed virtually quantitatively from minute samples. A still further object is to provide a practical and rapid analytical method for testing whether newborn infants show any disorder in metabolism. Still further objects are apparent from the description herein presented.

DETAILED DESCRIPTION OF THE DRAWING

In the figure a thin-layer chromatographic plate 1 comprises a substrate 2 on which there are two layers, an adsorbent layer 4 (layer II) superimposed edgewise over a reaction zone 3 (layer I). The substrate may be provided with a parting line 5 or some other means for readily separating the layers after layer I has served its essential function.

DETAILS OF THE INVENTION

Plate 1 contains, on a lower portion, a reaction zone 3 (layer I) made up of a mixture of cellulose with either 5–30% (by weight based on the total weight of the layer) of a strongly basic or strongly acidic polystyrene-based ion exchanger, or 50–80% (by weight based on the total weight of the layer) of a strongly acidic or strongly basic cellulose ion exchanger and, on an upper portion, an adsorption layer 4 (layer II) composed of a customary adsorbent suitable for amino acids. A process is provided for the separation of amino acids by thin-layer chromatography from solutions containing contaminants. Prior to separating the amino acids by thin-layer chromatography, a desalting process is conducted on a thin-layer chromatographic plate 1 by applying the amino acid solutions to layer I, rinsing the latter with water or eluting the latter with water, drying, and then effecting a normal elution with a mobile phase, which mobile phase contains a volatile acid when a strongly basic ion exchanger is employed, or a volatile base when an acidic ion exchanger is employed; after the amino acids are transported to an approximate height of 1–2 cm. into the upper layer II, the lower layer I is severed. The chromatogram of the amino acids is then developed in the usual manner.

The ion exchanger employed for the production of the reaction zone (layer I) must possess a purity sufficient for thin-layer chromatography. The particle size of the ion exchanger is, insofar as is possible, below 60$\mu$ in diameter. All ion exchangers which have strongly acidic or strongly alkaline groups (in the H$^+$ or OH$^-$ form, respectively) are suitable. Those ion exchangers which do not swell materially in employed solvents are preferred, since adhesion of the layer to the substrate is impaired by such swelling.

All known types of strongly acidic or strongly basic cellulose ion exchangers can be employed. These include, e.g., cellulose phosphoric acid esters, sulfomethylcellulose or sulfoethylcellulose, polyphosphate-impregnated cellulose and ECTEOLA-cellulose [epichlorohydrin triethanolamine cellulose], as well as, in particular triethylaminoethyl cellulose as a strongly basic ion exchanger. Accordingly, suitable cellulose ion exchangers comprise substituted celluloses as well as those products wherein exchange-active groups have been applied to native cellulose by impregnation. Preferred polystyrene-based ion exchangers with strongly acidic groups are, e.g., polystyrenes containing sulfonic acid groups. Such polystyrenes are known, for example, under the commercial names of "Dowex 50X–8," "Merck Ion Exchanger I," Amberlite IR–120" and "Zeokarb 225." Also synthetic resin ion exchangers of the "Lewatite," "Permutit" and "Duolite" types can be employed. Preferred basic ion exchangers are those of quaternary ammonium salts, e.g. "Dowex 1–X8," "Ion Exchanger Merck III" or "Amberlite IR A–400" (all based on polystyrene).

The proportion of polystyrene-based ion exchanger in the total adsorbent in layer I ranges between 5 and 30%, preferably about 10% by weight. In contrast thereto, the cellulose ion exchangers are employed in quantities of 50–80% by weight based on the total amount of adsorbent in layer I.

Outside these limits, the desired effects cannot be achieved, i.e. no distinctive chromatogram of the amino acids is obtained.

Any cellulose which is suitable for thin-layer chromatography can be mixed with the strongly acidic or strongly basic ion exchangers. Microcrystalline cellulose is particularly advantageous.

The cellulose-exchanger mixture is ordinarily mixed with a binder in order to obtain improved adhesion to the substrate. Particularly suitable for this purpose is carboxymethylcellulose; however, other conventional binders, such as starch, gypsum, extremely finely divided silicon dioxide, extremely finely aluminium oxides and the hydrates thereof, as well as polymerizates (copolymerizates and mixed polymerizates) of carboxyl-group-containing polyvinyl compounds and the salts thereof, can be added, particularly salts of polyacrylic acids and/or polymethacrylic acids, polyacrylamides and polymethacrylamides, as well as the derivatives thereof which are mono- or disubstituted on the amide nitrogen by lower alkyl groups. The proportion of the binder in the mixture is about 0.01 to 12% by weight; when carboxymethylcellulose is employed, preferably 0.04 to 0.1% by weight.

The adsorbent layer 4 contains any adsorbent suitable for the chromatography of amino acids. Particularly satisfactory results are obtained with cellulose, silica gel and/or kieselguhr. Said layer can also contain further conventional additives, such as binders, adhesives or fluorescent indicators. Typical adhesives are, e.g. carboxymethylcellulose or any of the above mentioned binders, and exemplary fluorescent indicators include, e.g. Mn-activated zinc silicate, Pb/Cu-activated calciumsilicate, and copper/zinc sulfide.

To prepare the two-layer plate 1, the suspensions for the two layers are separately produced. The cellulose-exchanger mixture is first suspended, optionally with the addition of the binder, in up to ten times, preferably three to four times, the minimum amount of required water. When employing carboxymethylcellulose as the binder, the mixture is suspended, for example, in three to four times the amount by weight of an approximately 0.05% (by weight) aqueous solution of carboxymethylcellulose. Thereafter, the mixture is homogenized. The adsorbent layer proper and the suspension required therefor are prepared in accordance with standard methods. The ratio of adsorbent to liquid is varied to a minor extent under certain circumstances, so that the suspension for layer II may have approximately the same consistency as the ion-exchanger-containing suspension for layer I.

The suspensions are then filled, in a ratio corresponding to layer width into appropriate compartments of a device suitable for the preparation of two- or multiple-layer plates, and the plates are provided with layers in the conventional manner. Such devices are well known in the art and readily available (see, for example, Chemische Technik, vol. 19, No. 11, p. 693, 1967). The layer thickness is set from 200–500$\mu$. The preferred thickness of the layer is 0.25 mm. when the layer is mounted. Preferred dimensions of the substrates are 20 x 20 cm., 20 x 10 cm.

or 10 x 10 cm. The preferred width of the exchanger strip is 1.5-2 cm., its length is 20 or 10 cm., respectively.

As the carrier material or substrate for the layers, all customary substances, e.g. glass, metal foils (particularly aluminum foil), synthetic films, paper, and similar materials can be employed.

The process of this invention is conducted with the two-layer plate, e.g. as follows:

An amino-acid-containing solution, which can optionally contain neutral substances and/or salts, is applied to the reaction zone (layer I) in a conventional manner in spots or bands side-by-side at a distance of about 1-1.5 cm. from the lower plate edge. Thereafter, the layer I is rinsed off with water, e.g., with the aid of a pipette or washing bottle. The water rinsing step can also be replaced by developing, with water as the eluting agent, to such an extent that the troublesome accompanying substances are transported beyond the subsequent front line of the chromatogram into an unused part of the layer. After drying, the plate with the layer I at the bottom, is placed in a mobile phase to a depth of about 0.5 cm.; this mobile phase transports the amino acids from the reaction zone 3 into the adsorbent layer II provided for the chromatography proper.

When the reaction zone contains a strongly acidic exchanger, the mobile phase must contain a volatile base, whereas, for a strongly basic exchanger, a volatile acid must be present in the mobile phase. Suitable volatile bases, in addition to ammonia, which is preferred, include diethylamine, triethylamine, and piperidine. Preferred volatile acids are acetic acid or formic acid. The most suitable eluting agents are mixtures of methanol and water. However, it is also possible to employ any other solvents useful for amino acid separation processes, e.g. ethanol/water, pyridine/water and ammonia/water. Also ternary or quaternary mixtures, such as methanol/ammonia/water and pyridine/dioxane/ammonia/water, can be successfully employed. After the front of the amino acids has been conveyed to a height of about 1-2 cm. into the adsorbent layer, the reaction zone (layer I) is suitably severed; thereafter, subsequent to a drying step, a normal chromatography is conducted for the separation of the amino acids. This chromatography is conducted in a conventional manner one-dimensionally or two-dimensionally.

As heretofore noted, the subject invention is useful, inter alia, for the analysis of amino acids in biological fluids and hydrolyzates which ordinarily contain contaminants that interfere with previously-practiced methods of thin-layer chromatography. Illustrative biological fluids and hydrolyzates and interfering contaminants accompanying therewith are noted in the following table:

TABLE

| Biological fluid or hydrolyzate | Associated interfering contaminants |
| --- | --- |
| Urine | NaCl, urea, carbohydrates. |
| Serum | NaCl, proteins. |
| Plasma | NaCl, proteins. |
| Liquor cerebrospinalis | NaCl, urea, proteins. |
| Hydrolyzates of peptides such as: Oxytocine, Insuline, Glucagone, Vasopressine, Gramicidine | |
| Hydrolyzates of protein such as: Albuminos, Globulines, Lysozyme, Asparaginase, Pepsine, Kollagenase | HCl, NaCl, fats carbohydrates, Ca-salts. |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION OF THE TWO-LAYER PLATE

Example 1

(a) Spreading mass for the exchanger layer.—Ion exchanger I, strongly acidic (Merck, Darmstadt) a polystyrene derivative with nuclear-substituted sulfonic acid groups, is washed successively with water, methanol and diethyl ether. The washed exchanger is then pulverized in a mortar and thereafter classified by means of a 60 micron ($\mu$) screen. The siftings are employed. The comminuted exchanger is washed successively with 1 N hydrochloric acid, water, methanol and diethyl ether, and then dried in the air. 45 grams (g.) of microcrystalline cellulose and 5 g. of exchanger are suspended in 180 milliliters (ml.) of a 0.5% solution of carboxymethylcellulose in water and homogenized for 15 seconds in a mixer.

Replacing the ion exchanger I MERCK with the same amount of one of the following exchangers: "Amberlite IR 120"; "Dowex 50"; "Permutit RS"; "Lewatit S 100" and following the same procedure results in similar preparations which are used with equal success.

(b) Spreading mass for the cellulose layer.—50 g. of cellulose are homogenized in 200 ml. of distilled water. Both spreading masses are storable for weeks, when kept in closed containers. Before use, they must be vigorously shaken.

(c) Drawing of the layer.—For the preparation of five 20 centimeter (cm.) x 20 cm. plates, each carrying a 2 cm. wide exchanger strip, approximately 10 ml. of the exchanger spreading mass and 80 ml. of the cellulose spreading mass are filled into the appropriate chambers of a conventional multiple-layer spreading device, and applied at a layer thickness of 0.25 millimeter (mm.).

The plates are then briefly dried in the air prior to being placed for about 10 to 15 minutes in a drying chamber at 80°–90° C. The finished plates are best stored in a desiccator, placed layer against layer, in order to prevent contamination from the atmosphere. It is also advisable to develop empty plates, immediately before use, with water in a chamber in order to shift contaminants into the unused portion of the plate.

Example 2

Analogously to Example 1, a plate is produced wherein a macroporous, strongly acidic ion exchanger of the type "Lewatit" is employed as the exchanger (polystyrene basis, sulfonic acid groups). The screened particles under 60$\mu$, obtained after the grinding step, are employed.

The spreading mass for the cellulose layer remains unchanged, and the drawing of the layer is conducted in the same manner as in Example 1(c).

Example 3

(a) Spreading mass for the exchanger layer.—12.5 g. of phosphorylated cellulose in the H+-form (manufacturer: Macherey & Nagel, Germany), fiber length 5–25 microns, particle size <60$\mu$, and 12.5 g. of microcrystalline cellulose ("Avicel SF") are suspended with 85 ml. of a 0.5% solution of carboxymethylcellulose in water and homogenized for 15 seconds in an electrical mixer.

(b) Spreading mass for the cellulose layer.—100 g. of microcrystalline cellulose ("Avicel SF") are suspended in 350 ml. of demineralized water and homogenized for 15 seconds in an electrical mixer.

(c) Drawing of the layer.—The drawing of the layer takes place as described in Example 1(c).

For further layer applications, the phosphorylated celluose is replaced, respectively, by commercially available triethylaminoethyl cellulose, sulfoethylcellulose, sulfomethylcellulose or ECTEOLA-cellulose.

CHROMATOGRAPHY

Example 4

Onto the cleansed and dried plate, prepared according to Example 1, 6 urine specimens of 2 microliters (μl.) each are applied at a spacing of 1.5 cm. from the lower edge, in a stroke of 2 cm. in length, on the exchanger layer, a distance of 1 cm. remaining between the individual specimens. The plate is carefully rinsed with water along the exchanger strip. After drying, the plate is developed twice up to a distance of 1.5 cm. above the exchanger strip, ammonia/methanol/water (15/50/35) being the mobile phase. The exchanger strip is then cut off, and the plate is chromatographed twice over 7.5 cm. with the mobile phase of butanol/acetone/glacial acetic acid/water (35/35/10/20).

The amino acids are detected in a conventional manner by spraying with a ninhydrin solution.

If an amino acid band, as compared to the other amino acid bands of the same urine specimen, is substantially stronger than usual and as compared to the remaining urine specimens of the chromatogram, then there is the suspicion of hyperaminoaciduria. On the basis of the position of the band(s) it is determined which amino acids are involved. If nothing striking is noticed in the chromatogram of a urine specimen, it is concluded that no hyperaminoaciduria is present.

Example 5

On a 10 x 10 cm. plate with a layer I having a width of 1.5 cm. (produced in accordance with Example 1), approximately 5μl. of a hydrolyzate (obtained from the peptide oxytocine and hydrochloric acid) is applied on the ion exchanger strip (layer I) over as small an area as possible at a spacing of 1 cm. from the lower and from a lateral plate edge.

Of each amino acid, about 0.02–0.2 μg. must be applied. After the solvent of the hydrolyzate has been evaporated, the exchanger strip is carefully rinsed off with 5–10 ml. of water from a pipette. Another drying step is then conducted. Thereafter, the amino acids are displaced to an extent of 1 cm. into the cellulose layer by developing twice with the eluting agent methanol/ammonia/water (50/15/35). The ion exchanger strip is cut off. Thereafter, a two-dimensional chromatography of the amino acids follows in the conventional manner. A distinct separation of the amino acids is achieved (ninhydrin coloring).

Example 6

2 μl. of urine are applied in the form of a dot to a 10 cm. x 20 cm. two-layer foil or glass plate with a 3 cm.-wide ion exchanger strip (according to Example 2) on the exchanger strip in a corner at a distance of 1.5 cm. from the edge. The foil or plate is developed over 20 cm. with water as the eluting agent in such a manner that the ion exchanger layer is immersed in the elution agent. Then, the plate is dried and developed twice with the eluting agent methanol/ammonia/water (50/20/30) to 1.5 cm. beyond the exchanger strip.

Now, the ion exchanger strip and the upper portion of the foil are separated so that a 10 x 10 cm. foil or plate is produced. This foil is now developed two-dimensionally in the usual way. The system of pyridine/dioxane/ammonia/water (35/35/15/15) is employed as the first eluting agent, and butanol/acetone/glacial acetic acid/water (35/35/10/20) is used as the second eluting agent. The development is conducted twice in each case with the same eluting agent up to the plate edge in different directions. The detection of the amino acids on the chromatrogram is effected in the usual manner with ninhydrin. The ninhydrin is, alternatively, replaced by proline, Ehrlich's reagent or other detection agents.

The method permits an excellent separation of the urinary amino acids and serves for the detection of anomalies of amino acid metabolism. Corresponding results are likewise obtained when employing one of the foils in accordance with Example 3.

The preceding examples can be repeated with similar success by substituting the generically or specifically described compositions for layer I and layer II and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thin-layer chromatography two-layer plate comprising a substrate, a reaction zone layer which covers a minor portion of a surface of the substrate and an adsorption layer which covers the remaining major portion of the same surface of the substrate, the reaction zone layer being of a composition for separating amino acids from accompanying interfering substances and the adsorption layer being of a composition suitable for the chromatography of amino acid.

2. A two-layer plate according to claim 1 wherein the composition of the reaction zone layer consists essentially of particles which are less than 60μ in diameter.

3. A two-layer plate according to claim 1 wherein the reaction zone layer is composed of a mixture of microcrystalline cellulose with an ion exchanger.

4. A two-layer plate according to claim 1 wherein the reaction zone layer comprises from 0.01 to 12 percent by weight of binder.

5. A two-layer plate according to claim 1 wherein the reaction zone layer contains at least one spot or streak of an amino-acid-containing composition.

6. A method for rapidly and effectively determining disturbances in amino acid metabolism in an infant which comprises chromatograming a body fluid of the infant on a two-layer plate according to claim 1.

7. A method of virtually quantitatively chromatograming amino acid in a specimen containing interfering material which comprises applying the specimen to the reaction zone of a two-layer plate according to claim 1.

8. A two-layer plate as defined by claim 1, the adsorption layer being superimposed edgewise over the reaction zone layer.

9. A two-layer plate according to claim 1 wherein the reaction zone layer is readily severable from the adsorption layer.

10. A two-layer plate according to claim 9 wherein the reaction zone layer is composed of a mixture comprising from 95–70% by weight of cellulose and from 5–30% by weight of strongly basic polystyrene-based ion exchanger, the percentages being based on the total weight of the mixture.

11. A two-layer plate according to claim 9 wherein the reaction zone layer is composed of a mixture comprising from 95–70% by weight of cellulose and from 5–30% by weight of strongly acidic polystyrene-based ion exchanger, the percentages being based on the total weight of the mixture.

12. A two-layer plate according to claim 9 wherein the reaction zone layer is composed of a mixture comprising from 50–20% by weight of cellulose and from 50–80% by weight of strongly acidic cellulose ion exchanger, the percentages being based on the total weight of the mixture.

13. A two-layer plate according to claim 9 wherein the reaction zone layer is composed of a mixture comprising from 50–20% by weight of cellulose and from 50–80% by weight of strongly basic cellulose ion exchanger, the percentages being based on the total weight of the mixture.

14. A two-layer plate as defined by claim 1 wherein said reaction zone layer comprises ion exchange means having strongly acidic or strongly alkaline groups, and wherein said adsorption layer suitable for the chromatography of amino acids consists essentially of an adsorbent selected from the group consisting of cellulose, silica gel, kieselguhr and mixtures thereof.

15. A two-layer plate according to claim 14 wherein the reaction zone layer is composed of a mixture comprising from 95–70% by weight of cellulose and from 5–30% by weight of strongly basic polystyrene-based ion exchanger, the percentages being based on the total weight of the mixture.

16. A two-layer plate according to claim 14 wherein the reaction zone layer is composed of a mixture comprising from 95–70% by weight of cellulose and from 5–30% by weight of strongly acidic polystyrene-based ion exchanger, the percentages being based on the total weight of the mixture.

17. A two-layer plate according to claim 14 wherein the reaction zone layer is composed of a mixture comprising from 50–20% by weight of cellulose and from 50–80% by weight of strongly acidic cellulose ion exchanger, the percentages being based on the total weight of the mixture.

18. A two-layer plate according to claim 14 wherein the reaction zone layer is composed of a mixture comprising from 50–20% by weight of cellulose and from 50–80% by weight of strongly basic cellulose ion exchanger, the percentages being based on the total weight of the mixture.

19. A process for amino acid separation, by thin-layer chromatography, from a solution containing interfering material which comprises sequentially applying the solution to the reaction zone of a two-layer plate according to claim 1, treating said reaction zone with water, drying the reaction zone, eluting the reaction zone with a mobile phase to transport amino acid from said solution into the adsorption layer, severing the reaction zone from the adsorption layer and development of the amino acid chromatogram.

20. A process according to claim 19 wherein the solution is urine.

21. A process according to claim 19 wherein the reaction zone comprises a strongly basic ion exchanger and the mobile phase comprises a volatile acid.

22. A process according to claim 19 wherein the reaction zone comprises a strongly acidic ion exchanger and the mobile phase comprises a volatile base.

23. A process according to claim 19 wherein the solution comprises hydrolyzate of at least one amino-acid-containing high molecular compound.

24. A process according to claim 19 wherein the reaction zone comprises a mixture of from 70–95% by weight of cellulose and from 30–5% by weight of polystyrene-based ion exchanger.

25. A process according to claim 24 wherein the reaction zone comprises a mixture of about 90% by weight of microcrystalline cellulose and about 10% by weight of polystyrene exchanger containing sulfonic acid groups.

26. A process according to claim 25 wherein the mobile phase comprises ammonia.

References Cited

Gordon et al.: Practical Chromatographic Techniques, Van Nostrand Co., Inc., POSL QD271 G5, pp. 186 to 191 relied on.

MORRIS O. WOLK, Primary Examiner

R. M. REESE, Assistant Examiner

U.S. Cl. X.R.

23—253 R; 73—61.1 C; 117—16; 210—31; 424—2